United States Patent [19]

Repella

[11] Patent Number: 4,574,461
[45] Date of Patent: Mar. 11, 1986

[54] WORKPIECE HOLDER

[75] Inventor: James A. Repella, Berkley, Mich.

[73] Assignee: Microdot Inc., Darien, Conn.

[21] Appl. No.: 634,604

[22] Filed: Jul. 26, 1984

[51] Int. Cl.⁴ .......................... B23Q 3/06; B23B 31/10
[52] U.S. Cl. ............................. 29/564; 29/148.4 S; 198/476.1; 279/1 E; 279/1 SG; 279/102; 269/13; 198/803.14
[58] Field of Search .................. 29/563, 148.4 S, 564, 29/38 A, 33 P; 279/1 SG, 1 SN, 1 W, 102, 1 E; 198/802, 478, 345, 344; 269/287, 55, 58, 13

[56] References Cited

U.S. PATENT DOCUMENTS

| | | | |
|---|---|---|---|
| 1,802,655 | 4/1931 | Kavle | 279/1 E |
| 2,182,799 | 12/1939 | Farr | 29/38 A |
| 2,449,161 | 9/1948 | Craig et al. | 279/102 |
| 2,719,721 | 10/1955 | Grobey | 279/1 E |
| 2,962,153 | 11/1960 | Brodbeck | 269/13 X |
| 3,096,709 | 7/1963 | Eldred et al. | 198/478 X |
| 3,147,018 | 9/1964 | Reichert | 279/1 SG |
| 3,764,127 | 10/1973 | Keller | 269/287 |
| 3,812,949 | 5/1974 | Lush | 198/478 X |
| 4,238,875 | 12/1980 | Van Sickle | 29/148.4 S |

*Primary Examiner*—William R. Briggs
*Attorney, Agent, or Firm*—Lyman R. Lyon

[57] ABSTRACT

A workpiece holder module for handling annular seals comprising a retainer module, a motor positioned beneath the module and having a hollow drive shaft extending upwardly and drivingly into the bottom of the module, and an air supply structure including a hollow column fixedly and centrally positioned beneath the motor with its upper end rotatably and sealingly receiving the lower end of the hollow motor drive shaft. The retainer module includes an upwardly opening cup-shaped casing centrally receiving the upper end of the hollow motor drive shaft, a resilient retainer ring positioned on the upper annular edge of the casing sidewall, and a central plug member secured to the upper end of a central post portion upstanding from the base portion of the casing. The annular seal includes an outer metallic ring adapted to be frictionally retained within the resilient retainer ring and an inner elastomeric ring adapted to seat on the central plug member. The motor may be actuated to spin the retainer module and thereby the retained seal to facilitate a work operation on the seal, and pressurized air may be routed upwardly through the hollow column and through the hollow motor drive shaft where it acts against the bottom of an annular piston positioned around the central post of the casing to raise the piston and thereby upwardly eject the seal from the retainer module.

4 Claims, 4 Drawing Figures

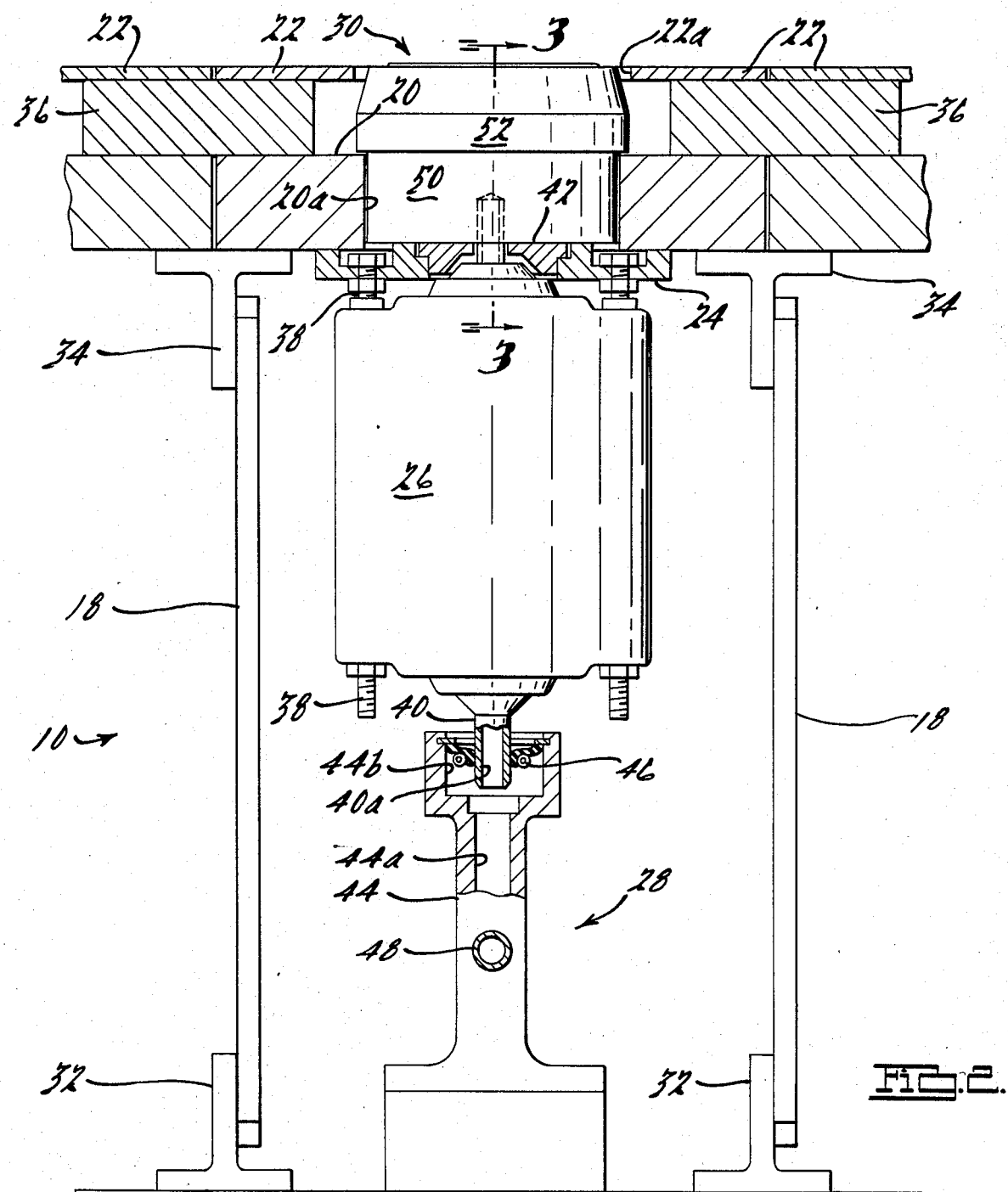
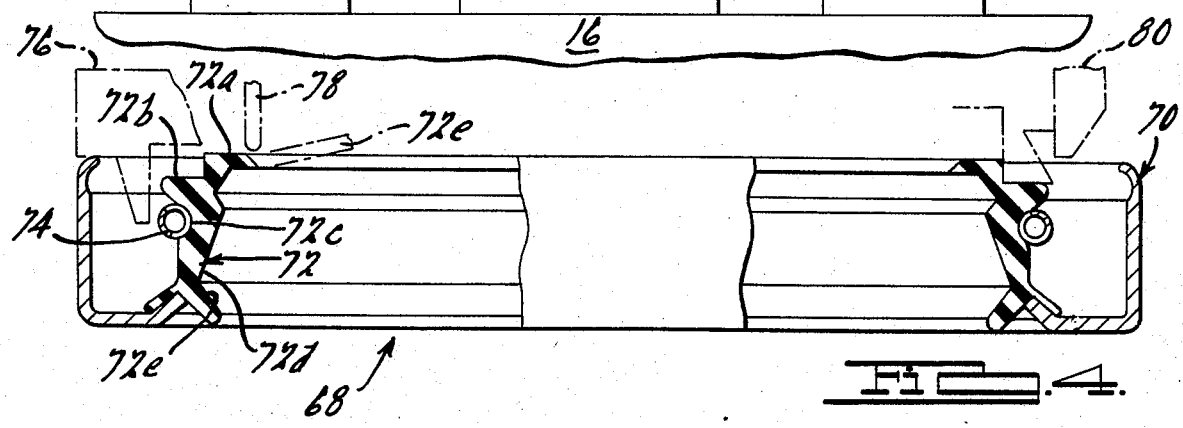

WORKPIECE HOLDER

BACKGROUND OF THE INVENTION

This invention relates to transfer mechanisms and, more particularly, to workpiece holder devices adapted to receive a workpiece and transfer it successively to a plurality of work stations for successive work operations by work devices positioned at the work stations.

A myriad of workpiece holder devices have been proposed for use with a myriad of different workpieces and in a myriad of different work environments. Although the workpiece holder of the invention has broad application to different workpieces in different work environments, it is particularly suited to transfer an annular seal to a series of work stations for successive work operations by work devices positioned at the work stations.

SUMMARY OF THE INVENTION

It is an object of the present invention to provide a workpiece holder device that is simple in construction and that functions to selectively and precisely position, retain, and manipulate the workpiece in accordance with the varying requirements of a plurality of work devices.

A more specific object is to provide a workpiece holder device that functions to selectively and precisely position, retain, and manipulate an annular seal in accordance with the varying requirements of a plurality of work and/or assembly operations to be performed on the seal.

The workpiece holder device according to the invention includes a retainer module adapted to frictionally receive a workpiece at its upper face and retain the workpiece in position at that face; means to rotate the module about its central vertical axis and thereby rotate the workpiece to facilitate a work operation by a work device positioned at a work station; and means to raise the workpiece above the level of the upper face of the module to facilitate discharge of the workpiece from the workpiece holder device.

According to another feature of the invention, the retainer module is designed for use with an annular seal and includes a cylindrical cup-shaped upwardly opening casing; a retainer ring of elastomeric material positioned on the upper annular edge of the casing and having an internal diameter slightly less than the external diameter of a seal, whereby a seal positioned within the ring will be frictionally retained in the ring; a plug member positioned coaxially within the retainer ring at the upper face of the module for coaction with the inner periphery of a seal frictionally retained within the retainer ring; and means positioned within the casing beneath a seal retained in the retainer ring and operative to engage the underside of the seal and raise the seal above the upper face of the module to facilitate discharge of the seal from the workpiece holder device.

According to a further feature of the invention, the means to rotate the module and retained seal comprises an electric motor positioned beneath the module and having a hollow, vertically oriented drive shaft passing centrally through the motor for driving engagement at its upper end with the base of the cupshaped casing of the module; and the means for raising the seal above the upper face of the module includes a piston positioned within the cup-shaped casing and means for routing air under pressure upwardly through the hollow drive shaft of the motor from a location below the motor housing to a location beneath the piston.

BRIEF DESCRIPTION OF THE DRAWINGS

FIG. 2 is a cross-sectional view taken on line 2—2 of FIG. 1;

FIG. 4 is a cross-sectional view of an annular seal comprising the workpiece for which the disclosed embodiment of the invention workpiece holder device has been designed.

DETAILED DESCRIPTION OF THE PREFERRED EMBODIMENT OF THE INVENTION

Figure 1:
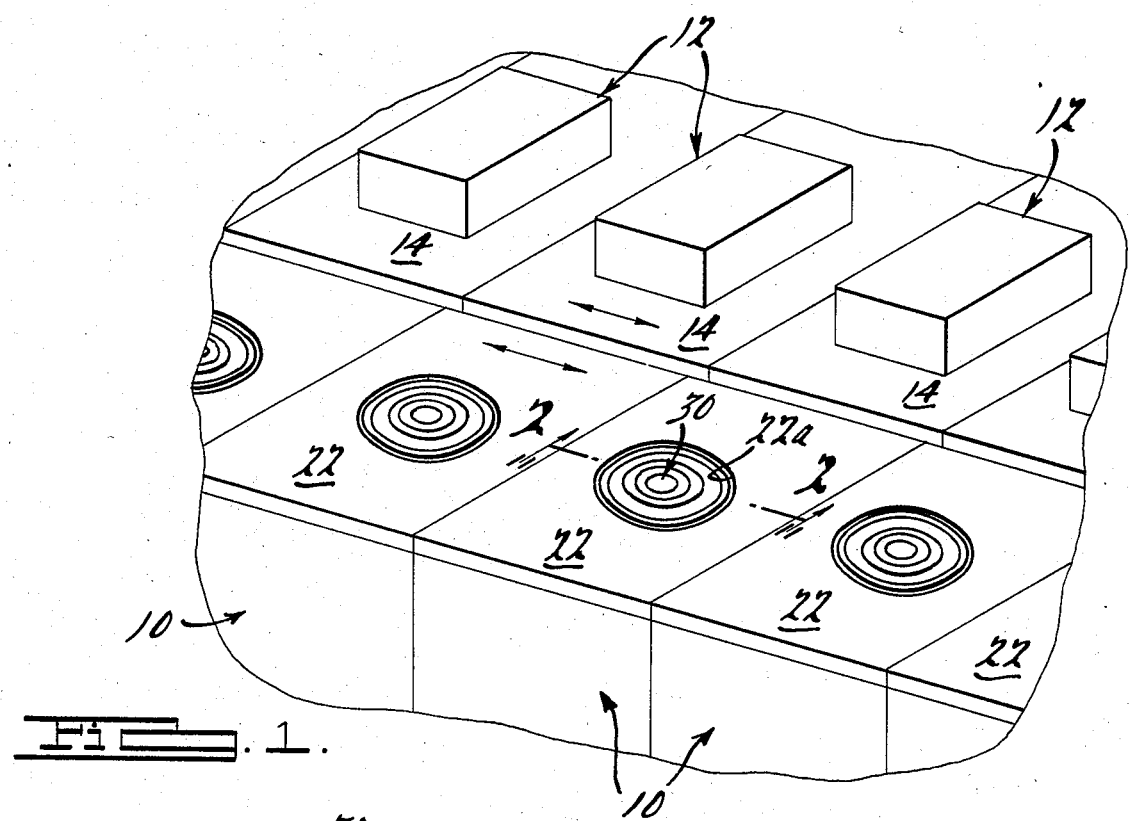
FIG. 1 is a somewhat schematic view showing a plurality of workpiece holder devices according to the invention arranged relative to a plurality of work devices positioned at a plurality of work stations.

In FIG. 1 a plurality of workpiece holder devices 10 are shown in association with a plurality of work devices 12 arranged at a plurality of work stations 14. As indicated by the directed arrows in FIG. 1, each workpiece holder device 10 is intended to be moved relative to work devices 12 to enable the work devices to successively perform a series of work operations on a workpiece carried by the workpiece holder device. This relative movement may be accomplished by movement of the workpiece holders, by movement of the work devices, or by selective differential movement of both the workpiece holder devices and the work devices.

Figure 3:
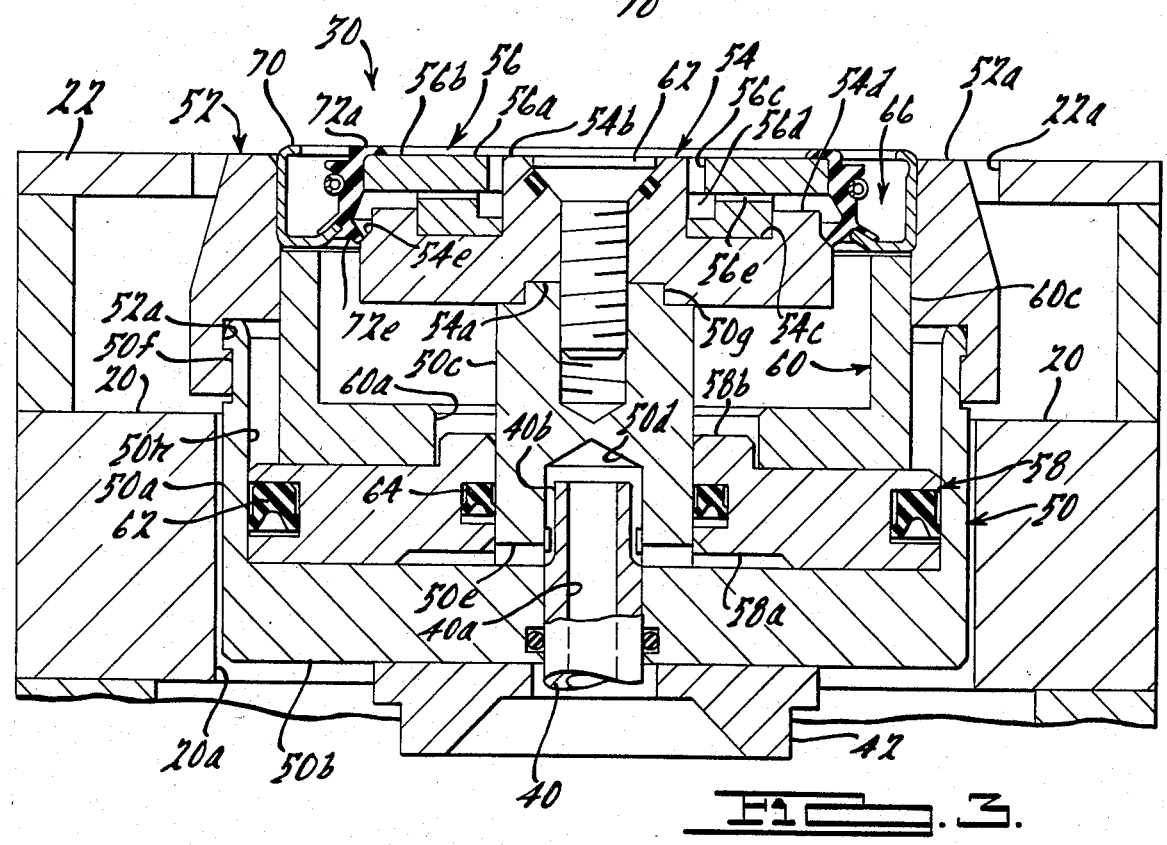
FIG. 3 is a cross-sectional view taken on line 3—3 of FIG. 2.

Each workpiece holder device 10, as best seen FIGS. 2 and 3, includes a base plate 16; a pair of bulkheads 18; a mounting plate 20; a face plate 22; an adapter plate 24; a motor 26; and air supply structure 28; and a retainer module 30.

Base plate 16 may take various forms and may, for example, as disclosed in the above references U.S. patent application, comprise a portion of a rotating turntable.

Bulkheads 18 comprise steel plates mounted to base plate 16 by T-section bracket members 32.

Mounting plate 20 comprises a metallic casting having a central circular opening 20a centered on the central vertical axis of the workpiece holder. Plate 20 is mounted on top of bulkheads 18 by T-section bracket members 34.

Face plate 22 is mounted to mounting plate 20 via spacers 36. Face plate 22 defines a central circular opening 22a somewhat larger than mounting plate opening 20a.

Adapter plate 24 is annular and is suitably mounted to the underside of mounting plate 20 in concentric relation to the central axis of the holder.

Motor 26 is an electric AC motor and is centrally secured to the underside of adapter plate 24 by bolts 38. The drive shaft 40 of motor 26 is hollow and includes a central vertical passage 40a. Shaft 40 extends upwardly above the motor housing for passage through a bearing member 42 carried centrally by adapter plate 24 and downwardly below the motor housing for coaction with air supply structure 28.

Air supply structure 28 includes a column member 44 rigidly upstanding from base plate 16 on the central axis of the holder. Column member 44 includes a central passage 44a and a counterbore 44b at the upper end of the column. The lower end of hollow motor drive shaft 40 is rotatably and sealingly received in counterbore 44b by a seal 46 positioned in that counterbore. An air supply conduit 48 communicates with the lower end of passage 44a and is adapted to be connected with a source (not shown) of pressurized air.

Retainer module 30 includes a casing 50, a retainer ring 52, a trim plug 54, a trim plug insert 56, a piston 58, and a piston 60.

Casing 50 is formed of steel and is cupshaped. Casing 50 includes a cylindrical side wall portion 50a, a base portion 50b, and a post portion 50c upstanding centrally from base portion 50b. Casing 50 is positioned on bearing member 42 and within mounting plate opening 20a. A central bore 50d opens at the lower face of base portion 50b and extends upwardly into post portion 50c. The upper end of motor shaft 40 is drivingly received in bore 50d with axial grooves 40b in the upper end of the shaft coacting with the upper blind end of bore 50d and with radial ports 50e in post 50c to provide fluid communication between the hollow interior of shaft 40 and the annular space between post 50c and casing side wall portion 50a.

Retainer ring 52 is formed of rubber or other elastomeric material and is positioned on the upper annular edge of casing side wall portion 50a with an annular internal groove 52a snappingly coacting with an annular external groove 50f adjacent the upper end of casing side wall portion 50a to securely position the ring on the casing. Retainer ring 52 is centered in face plate opening 22a with the annular upper face 52b of ring 52 generally flush with the upper face of face plate 22.

Trim plug 54 is formed of steel and is positioned on top of casing post portion 50c with a central recess 54a in the bottom face of the plug piloting on a hub portion 50g at the top of post portion 50c. A screw 62 passes through a central bore in a central hub portion 54b of the plug and into engagement with a threaded central bore in post portion 50c to secure plug 54 to the top of post portion 50c.

Trim plug insert 56 is formed of a plastic material such as nylon. Trim plug insert 56 is annular and is fitted over plug hub portion 54b with a central annular portion 56a of the insert seated in an annular groove 54c in plug 54 and a rim portion 56b overlying, but spaced above, an annular surface 54d on plug 54. Plug insert 56 includes notches 56c, an annular groove 56d, and radial ports 56e which coact to provide fluid communication between the area above the workpiece holder device and the annular space between insert rim portion 56b and plug annular surface 54d.

Piston 58 is an annular metallic member which is slidably fitted over casing post portion 50c with seals 62 and 64 respectively sealingly engaging casing inner wall 50h and the annular wall of casing post portion 50c. Piston 58 is cut away at 58a to expose the bottom surface of the piston to radial ports 50e.

Piston 60 is formed of a plastic material such as nylon. Piston 60 is cup-shaped and includes a central aperture 60a in its base portion piloting on a central hub portion 58b of piston 58. The cylindrical side wall portion 60c of piston 60 is aligned with the annular opening 66 defined between retainer 52 and plug 54 with the upper end of side wall portion 60c intruding into opening 66.

The invention work holder device as disclosed is designed for use with an annular seal workpiece of the type seen at 68 in FIG. 4. Seal 68 includes an outer metal ring 70, an inner elastomeric ring 72, and a circular garter spring 74. Elastomeric ring 72 includes a sealing lip portion 72a; a shoulder portion 72b; an annular groove 72c for receipt of garter spring 74; a side wall portion 72d; and a dust lip portion 72e. Elastomeric ring 72 is bonded to metal ring 70 in a molding operation performed prior to delivery of the seal to the invention workpiece holder device and spring 74 is assembled to the main body of the seal in one of the operations performed at the work stations to which the seal is delivered by the invention workpiece holder device.

A seal 68 is seen in FIG. 3 positioned in retainer module 30 with outer metal ring 70 received with a frictional force fit within an elastomeric retainer 52; sealing lip portion 72a of elastomeric inner ring 72 seated over the outer annular edge of rim portion 56b of plug insert 56; and dust lip portion 72e sealingly engaging an angled annular seat 54e on plug 54.

OPERATION

A seal 68 may be loaded into retainer module 30 at a loading station by a suitable insertion device such as the piston 76 seen in phantom in FIG. 4. The loading piston presses the seal forceably downwardly into the retainer module 30 to the loaded position seen in FIG. 3. The inner diameter of the retainer ring 52 is slightly less than the outer diameter of seal outer ring 70 so that retainer ring 52 yields elastically to admit the seal and the seal is held frictionally and firmly at the upper face of the retainer module.

The seal is now moved to a plurality of work stations to undergo a plurality of work operations by work devices positioned at the work stations.

At one such station, a trimmer knife 78 is employed to remove a mold flashing 72e from the inner elastomeric seal ring 72 in response to rotation of the retainer module 30 by motor 26.

At another station, a springer head seen in phantom at 80 in FIG. 4 is employed to assemble garter spring 74 to the seal with a downward stripping movement.

At another station, a testing head is lowered onto the top of the seal and pressurized air is blown through passages 56c, 56d and 56e to test the sealing capabilities of the seal and send a signal to a discharge station regarding the acceptability or unacceptability of the seal.

At the discharge station, pressurized air is conducted through conduit 48, column passage 44a, shaft passage 40a, casing bore 50d, and shaft grooves 40b to the underside of piston 58 where it acts against piston cutaway area 58a to raise piston 58 and piston 60. As piston 60 moves upwardly, its upper annular edge engages the lower annular edge of seal outer metal ring 70 for forceably upwardly dislodge the seal from retainer module 30 against the elastomeric gripping resistance of retainer ring 52. Once the seal has been elevated to a position above the upper face of the retainer module, pressurized air is selectively employed to move the seal to one of two discharge areas depending on the acceptability or unacceptability of the seal as previously determined by the testing head.

Further details of the various work operations and work devices briefly described above, as well as details of an apparatus for moving the seals selectively between successive work stations, are described in the referenced copending U.S. patent application.

The invention will be seen to provide a workpiece holder device that is simple in construction and operation and that functions to selectively and precisely position, retain and manipulate a workpiece in accordance with the varying requirements of a plurality of work devices. More specifically, the invention provides a workpiece holder that functions to selectively and precisely position, retain and manipulate an annular seal in accordance with the various requirements of a plurality of work and/or assembly operations to be performed on the seal.

Whereas a preferred embodiment of the invention has been illustrated and described in detail, it will be apparent that various changes may be made in the preferred embodiment without departing from the scope or spirit of the invention.

I claim:

1. A workpiece holder device for receiving a workpiece and transferring it successively to a plurality of work stations for successive work operations by work devices positioned at the work stations, said workpiece holder device comprising:
   A. a retainer module having means to receive a workpiece at its upper face and frictionally retain the workpiece in position at that face;
   B. means to rotate said module about its central vertical axis and thereby rotate said workpiece to facilitate a work operation by a work device positioned at a work station;
   C. means to raise the workpiece above the level of said upper face to facilitate discharge of the workpiece from the workpiece holder device;
   D. said retainer module including a generally cup-shaped upwardly opening casing;
   E. said raising means including a piston positioned within said casing and engageable with the underside of a workpiece frictionally positioned at the open upper face of said module to raise the workpiece above said upper face in response to upward movement of said piston;
   F. said rotating means including a vertical drive shaft positioned beneath said module and extending upwardly into driving engagement with the base of said cup-shaped casing whereby rotation of said shaft rotates said casing and thereby the workpiece retained therein;
   G. said drive shaft being hollow;
   H. the hollow interior of said drive shaft communicating at the upper end of said drive shaft with the underside of said piston;
   I. said device further including means to supply air under pressure to the lower end of said drive shaft for upward passage through said shaft and subsequent passage to the underside of said piston to raise said piston and thereby raise the workpiece;
   J. said drive shaft comprising the drive shaft of an electric motor positioned beneath said module;
   K. the lower end of said drive shaft extending beneath the motor housing for communication with said air supply means;
   L. said air supply means comprising a fixed hollow upstanding column, and a conduit communicating at one end with the hollow interior of said column at a location below the upper end of said column and communicating at its other end with a source of pressurized air;
   M. the lower end of said drive shaft being rotatably and sealingly received in the upper end of said column;
   N. said cup-shaped casing including a post upstanding centrally from the base of said casing;
   O. said piston being annular and positioned in the annular space between said post and said casing; and
   P. said retainer module further including
      (1) a plug member secured to the upper end of said post and adapted to coact with the inner periphery of a seal received at the upper face of the module and
      (2) a retainer ring of elastomeric material positioned on the upper annular edge of said casing and adapted to resiliently coact with the outer periphery of a seal received at the upper face of the module.

2. A retainer module for receiving an annular seal and transfering it successively to a plurality of work stations for successive work operations by work devices positioned at the work stations, said module comprising:
   A. a cylindrical cup-shaped upwardly opening casing;
   B. a retainer ring of elastomeric material positioned on the upper annular edge of said casing and having an internal diameter slightly less than the external diameter of a seal, whereby a seal positioned within said ring will be frictionally retained therein;
   C. a plug member positioned coaxially within said retainer ring at the upper face of said module for coaction with the inner periphery of a seal frictionally retained within said retainer ring; and
   D. means positioned within said casing beneath a seal retained within said retainer ring and operative to engage the underside of the seal and raise the seal above said upper face of said module;
   E. said casing including a post centrally upstanding from the base of the casing;
   F. said plug member being secured coaxially to the upper end of said post;
   G. said raising means comprising an annular piston positioned in the annular space between said post and the side wall portion of said casing; and
   H. said module includes conduit means for routing air under pressure to the underside of said piston to raise the piston and thereby raise the seal.

3. A retainer module according to claim 2 wherein:
   I. the upper portion of said piston comprises an annular wall aligned with the annular space between said plug member and said retainer ring and arranged to extend upwardly into that space to eject a seal.

4. A retainer module according to claim 3 wherein:
   J. said casing includes
      (1) a central bore opening at the lower face of said base and extending upwardly through said base and into said central post, and
      (2) radial passage means providing fluid communication between said central bore and the underside of said piston.

* * * * *